United States Patent
Scura et al.

(10) Patent No.: US 6,704,167 B1
(45) Date of Patent: Mar. 9, 2004

(54) DISK DRIVE INCLUDING DAMPING MEMBER DISPOSED UPON LATCH FOR DAMPING TANG-TO-LATCH IMPACT AND MITIGATING TANG-TO-LATCH CONTACT

(75) Inventors: John E. Scura, Paso Robles, CA (US); Pradeep K. Thayamballi, Freemont, CA (US); Haldun Arin, San Ramon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 217 days.

(21) Appl. No.: 09/945,406

(22) Filed: Aug. 31, 2001

(51) Int. Cl.[7] .................................................. G11B 5/54
(52) U.S. Cl. ................................................... 360/256
(58) Field of Search .......................... 360/256, 256.2, 360/256.4; 248/562; 264/46.6

(56) References Cited

U.S. PATENT DOCUMENTS

| | | | |
|---|---|---|---|
| 5,455,728 A | | 10/1995 | Edwards et al. ......... 360/256.2 |
| 5,483,399 A | * | 1/1996 | Jeong et al. ............ 360/256.2 |
| 5,583,724 A | * | 12/1996 | Kim et al. ............... 360/256.2 |
| 5,663,855 A | * | 9/1997 | Kim et al. ............... 360/256.2 |
| 5,703,735 A | * | 12/1997 | Bleeke .................... 360/256.2 |
| 5,729,405 A | * | 3/1998 | Isomura et al. .......... 360/256.2 |
| 5,815,350 A | * | 9/1998 | Kennedy et al. ......... 360/256.2 |
| 5,822,155 A | | 10/1998 | Oveyssi et al. .......... 360/256.2 |
| 6,028,744 A | * | 2/2000 | Amirkiai et al. ......... 360/256.2 |
| 6,040,960 A | * | 3/2000 | Lindrose et al. ......... 360/256.2 |
| 6,097,577 A | * | 8/2000 | Stefansky ................... 360/256 |
| 6,134,086 A | * | 10/2000 | Kim ........................... 360/256 |
| 6,172,856 B1 | * | 1/2001 | Jang ........................ 360/256.2 |
| 6,245,265 B1 | * | 6/2001 | Chung et al. ............... 264/46.6 |
| 6,371,433 B2 | * | 4/2002 | Anderson et al. ........... 248/562 |

* cited by examiner

Primary Examiner—Tianjie Chen
(74) Attorney, Agent, or Firm—Won Tae C. Kim, Esq.; Milad G. Shara, Esq.; Stetina Brunda Garred & Brucker

(57) ABSTRACT

A disk drive includes a disk drive base and a latch attached to the disk drive base. The latch includes a latch impact surface having a latch impact surface perimeter. The latch impact surface perimeter defines a latch impact surface area. The disk drive includes a head stack assembly coupled to the disk drive base. The head stack assembly includes a tang. The head stack assembly is sized and configured to rotate to a parked position with the tang in mechanical communication with the latch. The tang has a tang impact surface. The disk drive includes a damping member disposed upon and disposed between the latch and the tang for damping impact between the tang and the latch and mitigating contact between the tang impact surface and the latch impact surface. The damping member has a damping member surface area less than the latch impact surface area.

28 Claims, 3 Drawing Sheets

DISK DRIVE INCLUDING DAMPING MEMBER DISPOSED UPON LATCH FOR DAMPING TANG-TO-LATCH IMPACT AND MITIGATING TANG-TO-LATCH CONTACT

BACKGROUND OF THE INVENTION

CROSS-REFERENCE TO RELATED APPLICATIONS

Not applicable.

1. Field of the Invention

The present invention relates generally to a disk drive having a head stack assembly having a tang which impacts a latch, and more particularly to a damping member disposed between the latch and the tang with the head stack assembly in a parked position.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes at least one transducer head, sometimes two, which is distally attached to each of the actuator arms. The actuator assembly includes the actuator body that has a bore and a pivot bearing cartridge engaged within the bore. The at least one head gimbal assembly and the flex circuit cable assembly are attached to the actuator assembly.

Each magnetic disk includes opposing disk surfaces. Data may be recorded on a single surface or both along data annular regions. Non-data annular regions are typically disposed at the interior-most portion of the disk drive surfaces (typically referred to landing or parking zones). The non-data annular regions do not include any recorded data. When the disk drive is deactivated, the heads are "parked" at a position where they will not damage portions of the disk surface containing recorded data. As such, the head stack assembly may be pivoted such that each transducer head is disposed adjacent the non-data annular region. The head stack assembly further includes a tang that extends from the coil portion. The head stack assembly is configured to rotate to a parked position with the tang impacting a latch. The latch is attached to the disk drive base. The latch may include a magnet element that magnetically attracts the tang for latching the head stack assembly to the latch in the parked position.

A topic of concern is the desire to reduce the effects of the impact between the tang and the latch when moving the head stack assembly to the parked position. Accordingly, there is a need in the art for an improved head stack assembly latching arrangement in comparison to the prior art.

SUMMARY OF THE INVENTION

An aspect of the invention can be regarded as a disk drive that includes a disk drive base. The disk drive further includes a latch attached to the disk drive base. The latch includes a latch impact surface having a latch impact surface perimeter. The latch impact surface perimeter defines a latch impact surface area. The disk drive further includes a head stack assembly coupled to the disk drive base. The head stack assembly includes a coil portion and a tang extending from the coil portion. The head stack assembly being sized and configured to rotate to a parked position with the tang in mechanical communication with the latch. The tang has a tang impact surface. The disk drive further includes a damping member disposed upon the latch adjacent the latch impact surface and disposed between the latch and the tang with the head stack assembly in the parked position for damping impact between the tang and the latch and mitigating contact between the tang impact surface and the latch impact surface. The damping member has a damping member perimeter defining a damping member surface area less than the latch impact surface area.

According to an embodiment of the present invention, the latch includes a latch cup and a latch cap disposed within the latch cup. The latch cup has a cup open end. The cup open end defines the latch impact surface perimeter. The cap closed end defines a cap closed end surface area. The damping member surface area is less than the cap closed end surface area. The cap closed end is off-set from the cup open end away from the tang by an off-set depth. The damping member has a damping member thickness greater than the off-set depth. The latch includes a magnetic element for magnetically attaching the tang to the latch with the head stack assembly in the parked position. The magnetic element is disposed within the latch cap. The damping member is generally circular and planar. The damping member is adhesively attached to the latch. The damping member includes a damping member contact surface for contacting the tang impact surface and a damping member attachment surface for attaching the damping member to the latch. The damping member is formed of a viscoelastic adhesive. The damping member is deformable with the damping member contact surface moving relative to the damping member attachment surface upon contact between the tang impact surface and the damping member contact surface.

According to another aspect of the present invention, there is provided a disk drive that includes a disk drive base. The disk drive further includes a latch attached to the disk drive base. The latch includes a latch impact surface. The disk drive further includes a head stack assembly coupled to the disk drive base. The head stack assembly includes a coil portion and a tang extending from the coil portion. The head stack assembly is sized and configured to rotate to a parked position with the tang in mechanical communication with the latch. The tang has a tang impact surface. The disk drive further includes a damping member disposed upon the latch adjacent the latch impact surface and disposed between the latch and the tang with the head stack assembly in the parked position for damping impact between the tang and the latch and mitigating contact between the tang impact surface and the latch impact surface. The damping member has a damping member contact surface for contacting the tang impact surface and a damping member attachment surface for attaching the damping member to the latch. The damping member is deformable with the damping member contact surface moving relative to the damping member attachment surface upon contact between the tang impact surface and the damping member contact surface.

According to an embodiment of the present invention, the latch impact surface has a latch impact surface perimeter. The latch impact surface perimeter defines a latch impact surface area. The damping member has a damping member perimeter that defines a damping member surface area less than the latch impact surface area. The latch may include a latch cup and a latch cap disposed within the latch cup. The latch cup has a cup open end. The cup open end defines the latch impact surface perimeter. The latch cap has a cap closed end that defines a cap closed end surface area. The damping member surface area is less than the cap closed end surface area. The cap closed end is off-set from the cup open end away from the tang by an off-set depth. The damping member has a damping member thickness greater than the off-set depth. The latch includes a magnetic element for magnetically attaching the tang to the latch with the head stack assembly in the parked position. The magnetic element is disposed within the latch cap. The damping member is generally circular and planar. The damping member is adhesively attached to the latch. The damping member is formed of a viscoelastic adhesive.

DESCRIPTION OF THE PREFERRED EMBODIMENTS

Figure 1:
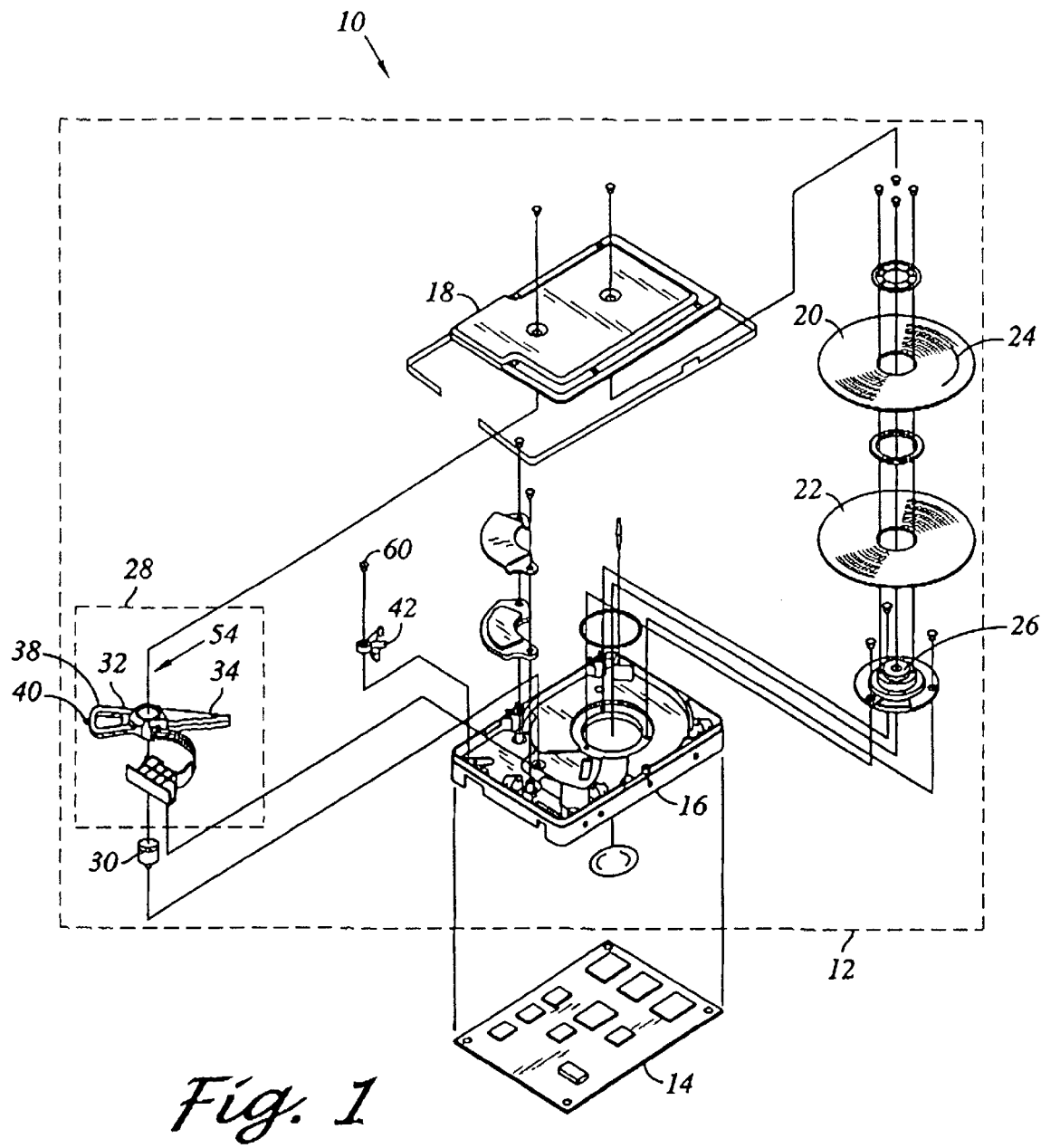
FIG. 1 is an exploded perspective view of a disk drive including a head stack assembly and latch as constructed in accordance with aspects of the present invention.

Referring now to the drawings wherein the showings are for purposes of illustrating preferred embodiments of the present invention only, and not for purposes of limiting the same, FIGS. 1–4 illustrate a disk drive 10 in accordance with the aspects of the present invention.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house magnetic disks 20, 22. Although two disks 20, 22 are shown, the present invention may be practiced with a single one of the disks 20 or 22 as well as will additional magnetic disks not shown. The disks 20, 22 each contain a plurality of tracks 24 for reading and writing data. The head disk assembly 12 further includes a spindle motor 26 for rotating the disks 20, 22. The head disk assembly 12 further includes a head stack assembly 28. A pivot cartridge 30 is provided for pivoting the head stack assembly 28 relative to the rotating disks 20, 22 for reading and writing data to and from the disks 20, 22.

The head stack assembly 12 includes a rotatable actuator 32. The actuator 32 includes a plurality of actuator arms 34. The actuator arms 34 include transducer heads 36 which distally extend from the actuator arms 34. The transducer heads 36 are configured to read/write data from the tracks 24. Further, the disks 20, 22 may each include data annular regions and a non-data annular regions. Such non-data annular regions (typically referred to landing or parking zones) are typically disposed at the interior-most portion of the disks 20, 22. The non-data annular regions do not include any recorded data. In this regard, when the disk drive 10 is deactivated, the transducer heads 36 may be "parked" at a position preferably where they will not damage those portions of the disks 20, 22 containing recorded data. As such, the head stack assembly 28 may be pivoted such that the transducer heads 36 are disposed adjacent the non-data annular regions. In this regard, the head stack assembly 28 further includes a coil portion 38 and a tang 40 that extends from the coil portion 38. As will be discussed in detail below, the head stack assembly 28 is configured to rotate to a parked position with the tang 40 impacting a latch 42 for latching the head stack assembly 28 to the latch 42 in the parked position.

Figure 2:
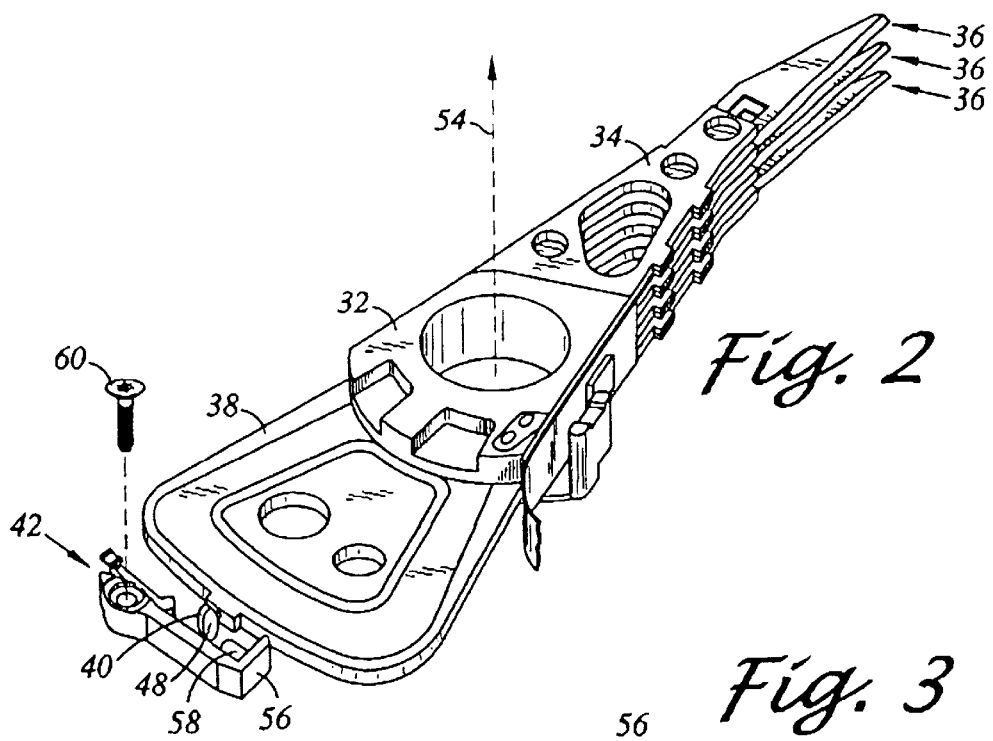
FIG. 2 is an enlarged view the head stack assembly and the latch of FIG. 1.
Figure 3:
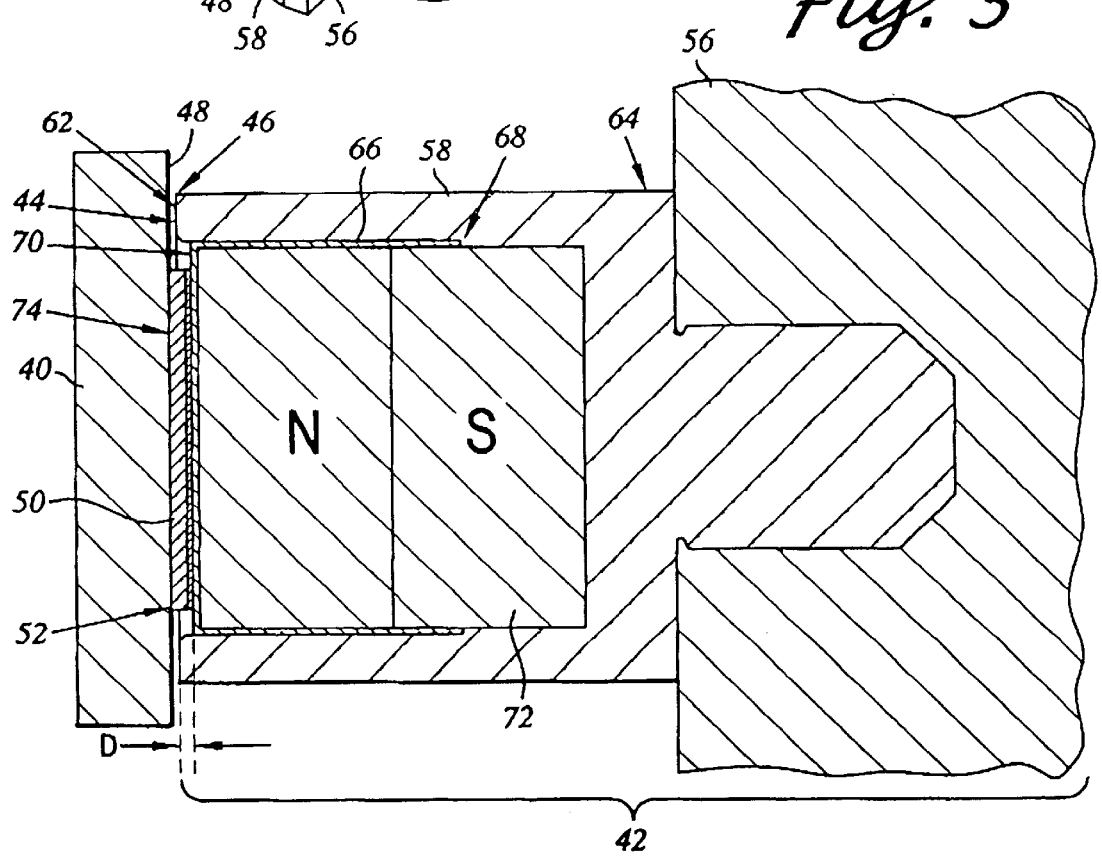
FIG. 3 is a cross-sectional view of the latch including a damping member as shown in connection with the tang according to aspects of the present invention.
Figure 4:
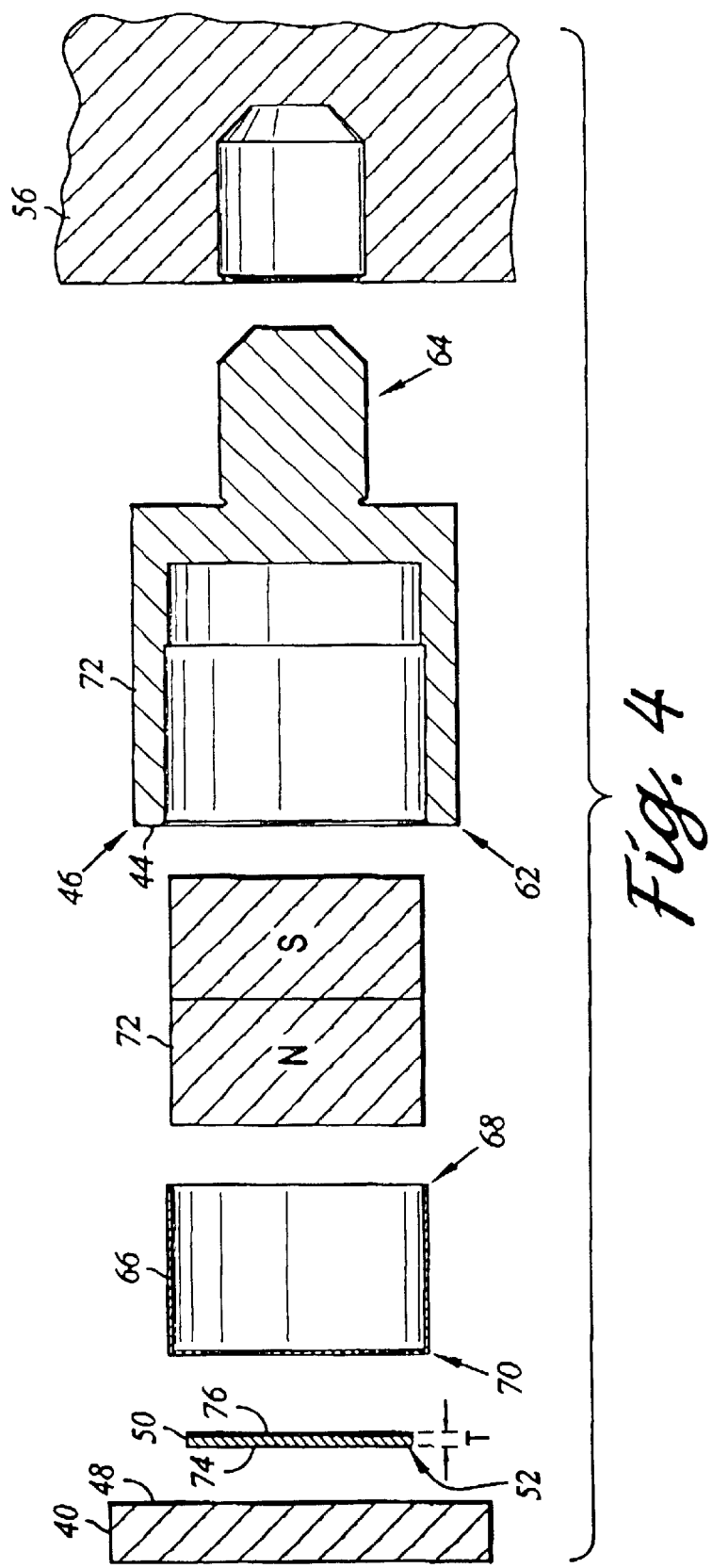
FIG. 4 is an exploded view of the latch shown in connection with the tang of FIG. 3.

Referring now additionally to FIG. 2, there is depicted an enlarged view the head stack assembly 28 and the latch 42 of FIG. 1. Further, FIG. 3 depicts a cross-sectional view of a portion of the latch 42 as shown in connection with the tang 40 according to aspects of the present invention, and FIG. 4 is an exploded view of the latch 42 and the tang 40 of FIG. 3.

An aspect of the invention can be regarded as the disk drive 10 that includes the disk drive base 16. The disk drive 10 further includes the latch 42 that is attached to the disk drive base 16. The latch 42 includes a latch impact surface 44 having a latch impact surface perimeter 46. The latch impact surface perimeter 46 defines a latch impact surface area. The disk drive 10 further includes the head stack assembly 28 coupled to the disk drive base 16. The head stack assembly 28 includes the coil portion 38 and the tang 40 that extends from the coil portion 38. The head stack assembly 28 is sized and configured to rotate to a parked position with the tang 40 in mechanical communication with the latch 42. The tang 40 has a tang impact surface 48. The disk drive 10 further includes a damping member 50 disposed upon the latch 42 adjacent the latch impact surface 44 and disposed between the latch 42 and the tang 40 with the head stack assembly 28 in the parked position for damping impact between the tang 40 and the latch 42 and mitigating contact between the tang impact surface 48 and the latch impact surface 44. The damping member 50 has a damping member perimeter 52 defining a damping member surface area less than the latch impact surface area.

In the absence of the damping member 50, the tang impact surface 48 is contemplated to uninterruptedly impact the latch impact surface 44 each time the head stack assembly 28 is parked. In dynamic terms, such parking is relatively violent or sudden. Upon such tang-to-latch impact, the transducer heads 36 which are disposed at an opposing end of the rotary actuator 32 from the tang 40 experience a relatively large change in velocity per unit of time. This takes the form of an acceleration spike (when plotted with the change in velocity versus time). Subsequently, the change in velocity per unit time of the transducer heads 36 has a sinusoidal character, with peak values progressively diminishing. The present invention recognizes that the acceleration spike may detrimentally affect the transducer heads 36. In this regard, in the case of the transducer heads 36 being of a magneto-resistive (MR) nature, the magnetic characteristics of the transducer heads 36 (in particular the MR read element) may be changed thereby detrimentally affecting the performance of the transducer heads 36. Advantageously, the damping member 50 tends to relatively reduce such acceleration spike as it tends to dampen the impact between the tang 40 and the latch 42.

In addition, in the absence of the damping member 50, the tang impact surface 48 is contemplated to uninterruptedly impact the latch impact surface 44 each time the head stack assembly 28 is parked. Over the lifetime of the disk drive 10, eventually the bare metal-to-metal contact between the tang impact surface 48 and the latch impact surface 44 would tend to abrasively wear. The present invention recognizes that such wear results in particulates being produced associated with the worn materials from the tang impact surface 48 and/or the latch impact surface 44. Given the closed nature of the disk drive 10, such particulates tend to contaminate the internal environment of the disk drive 10. Advantageously, the damping member 50 is specifically configured to mitigate contact between the tang impact surface 48 and the latch impact surface 44.

Moreover, it is contemplated that the utilization of the damping member 50 has the additional benefit of acoustic noise mitigation. In this regard, in the absence of the damping member 50 the tang impact surface 48 is contemplated to uninterruptedly impact the latch impact surface 44 each time the head stack assembly 28 is parked resulting in a metal-to-metal impact of the tang 40 to the latch impact surface 44. The damping member 50 being disposed between such metal-to-metal interface is contemplated to relatively mitigate sounds associated with a more direct metal-to-metal contact.

In the absence of the damping member 50, the tang 40 is generally designed to impact the latch 42 with the tang impact surface 48 parallel to the latch impact surface 44. Thus, the latch impact surface 44 is that surface which generally faces parallel to the tang impact surface 48 upon the tang 40 being latched to the latch 42. In practice, however, the present invention recognizes that tang impact surface 48 is not held perfectly parallel to the latch impact surface 44 upon impact and subsequently thereafter during the latching operation. Such non-perfectly parallel nature may be attributable to manufacturing tolerances for example. Further, it is contemplated that the rotatable actuator 32 of the head stack assembly 28 is configured to rotate about an axis of rotation 54 with the tang impact surface 48 translating with respect to such axis of rotation 54. The latch impact surface 44 is configured to be supported by a latch base 56. Upon impact of the tang 40 with the latch impact surface 44, the latch base 56 forms a moment arm that tends to give way to movement of the latch impact surface 44 about an axis of movement other than the axis of rotation 54. This tends to result in a non-perfectly parallel orientation of the tang impact surface 48 and latch impact surface 44 before and during impact of the tang 40 to the latch 42. Furthermore, this also tends to cause a relative motion between the tang impact surface 48 and the latch impact surface 44.

An aspect of the present invention recognizes that the materials (such as used to form the damping member 50) disposed across the entire tang-to-latch interface would tend to experience a non-uniform compression or pressure during a tang-to-latch impact due the such non-perfectly parallel nature of the tang impact surface 48 and latch impact surface 44. Such non-uniform compression would result in a localized high pressure region which may result in undue wear of material. Further, to the extent that adhesive is utilized to attach such a material at such interface, such localized pressure may undesirably tend to "squeeze out" such adhesive adjacent such local pressure. It is recognized that the aforementioned advantages of the damping member 50 may be achieved with the damping member 50 having the damping member perimeter 52 defining the damping member surface area less than the latch impact surface area. Such sizing of the damping member 50 tends to reduce the sensitivity to such non-perfectly parallel nature of the tang impact surface 48 and the latch impact surface 44 associated with localized pressures in comparison to a material which is sized the same as the latch impact surface 44.

According to an embodiment of the present invention, the latch 42 includes a latch cup 58. The latch cup 58 is supported by the latch base 56. The latch base 56 is attached to the disk drive base 16 with a fastener 60. In this regard, the latch 42 is attached to the disk drive base 16. However, such a direct attachment is not required and attachment to the disk drive base 16 may be accomplished via intermediate components. Further, while the latch base 16 is shown to be a separately formed component, it is contemplated that the latch base 16 and/or other components of the latch 42 may be integrally formed with the other components of the disk drive 10, such as the disk drive base 16.

The latch cup 58 has a cup open end 62 and an opposing cup closed end 64 attached to the latch base 56. The cup open end 62 defines the latch impact surface perimeter 46. The latch 42 further includes a latch cap 66 disposed within the latch cup 58. The latch cap 66 has a cap open end 68 and an opposing cap closed end 70. The latch 50 further includes a magnetic element 72 for magnetically attaching the tang 40 to the latch 42 with the head stack assembly 28 in the parked position. The magnetic element 72 is disposed within the latch cap 66. The cap closed end 70 defines a cap closed end surface area. As shown, the latch cup 66 is coaxially disposed within the latch cup 58 with the cap closed end 70 being disposed adjacent the cup open end 62.

In this embodiment, the cap closed end 70 is off-set from the cup open end 62 away from the tang 40 by an off-set depth D. The damping member 50 has a damping member thickness T greater than the off-set depth D. The damping member 50 is disposed upon the latch cap 66. The damping member 50 is sized to fit within the cup open end 62. As such, the damping member 50 extends beyond the cup open end 62 by the difference between the damping member thickness T and the off-set depth D. Preferably, the damping member surface area is less than the cap closed end surface area. As such, the damping member 50 is sized less than the cap closed end 70.

The sizing of the damping member 50 and the off-set D facilitate an ease of installation of the damping member 50 upon the cap closed end 70. In addition, placement of the damping member 50 within the cup open end 62 upon the off-set cap closed end 70 tend to confine the damping member 50 in a general locality with respect to the overall structure of the latch 42 of the latch/tang interface. In this regard, it is contemplated that over the course of repeated parking operations, the damping member 50 would experience forces that may tend to move the damping member 50 relative to the cap closed end 70. The off-set nature of the cap closed end 70 prevents the damping member 50 from moving beyond the latch impact surface 44. In addition, the off-set nature of the cap closed end 70 tends to mitigates affects non-perfectly parallel disposition of the tang impact surface 48 with regard to the latch impact surface 44 associated with of any adhesive squeeze out of any adhesive of the damping member 50. This is because any such squeeze out adhesive material would be confined within the cup open end 62 and off-set adjacent the cap closed end 70 thereby keeping any such material away from the tang impact surface 48.

Preferably, the damping member 50 is generally circular and planar. The damping member 50 includes a damping member contact surface 74 for contacting the tang impact surface 48. The damping member 50 further includes a damping member attachment surface 76 for attaching the damping member 50 to the latch 42. The damping member 50 may be adhesively attached to the latch 42, and in particular the cap closed end 64. The damping member 50 may be formed of a viscoelastic adhesive.

According to another aspect of the present invention, there is provided the disk drive 10 which includes the disk drive base 16. The disk drive 10 further includes the latch 42 attached to the disk drive base 16. The latch includes the latch impact surface 44. The disk drive 10 further includes the head stack assembly 28 coupled to the disk drive base 16. The head stack assembly 28 includes the coil portion 38 and the tang 40 extending from the coil portion 38. The head stack assembly 28 is sized and configured to rotate to the parked position with the tang 40 in mechanical communication with the latch 42. The tang 40 has the tang impact surface 48. The disk drive 10 further includes the damping member 50 disposed upon the latch 42 adjacent the latch impact surface 44 and disposed between the latch 42 and the tang 40 with the head stack assembly 28 in the parked position for damping impact between the tang 40 and the latch 42 and mitigating contact between the tang impact surface 48 and the latch impact surface 44. The damping member 50 has a damping member contact surface 74 for contacting the tang impact surface 48 and a damping member attachment surface 76 for attaching the damping member 50 to the latch 42. The damping member 50 is deformable with the damping member contact surface 74 moving relative to the damping member attachment surface 76 upon contact between the tang impact surface 48 and the damping member contact surface 74.

As mentioned above, it is contemplated that the rotatable actuator 32 of the head stack assembly 28 is configured to rotate about the axis of rotation 54 with the tang impact surface 48 translating with respect to such axis of rotation 54. Further, the damping member contact surface 74 is supported by the latch base 56. Upon impact of the tang 40 with the damping member contact surface 74, the latch base 56 forms a moment arm that tends to give way to movement of the latch impact surface 44 about an axis of movement other than the axis of rotation 54. This tends to result in the damping member 50 experiencing a shear load during impact. The deformable nature of the damping member 50 (i.e., the damping member contact surface 74 formed to move relative to the damping member attachment surface 76 upon contact between the tang impact surface 48 and the damping member contact surface 74) further dampens the tang-to-latch impact in this shear mode, in addition to a compression mode. Where a viscoelastic is utilized, such material would tend to advantageously absorb additional energy associated with such impact due to such shear load. Moreover, because the damping member contact surface 74 may move relative to the damping member attachment surface 76, relative movement between the tang impact surface 48 and the damping member contact surface 74 is mitigated. This advantageously reduces potential wear of the damping member 50 due to any such relative movement. The damping member 50 may take various other formed than that shown in FIGS. 3 and 4, such as a flattened tubing structure, a bubble-like membrane, or a structure having a toughened outer surface with an inner core conducive to shear motion.

We claim:

1. A disk drive comprising:
    a disk drive base;
    a latch attached to the disk drive base, the latch including a latch impact surface having a latch impact surface perimeter, the latch impact surface perimeter defining a latch impact surface area;
    a head stack assembly coupled to the disk drive base, the head stack assembly including a coil portion and a tang extending from the coil portion, the head stack assembly being sized and configured to rotate to a parked position with the tang in mechanical communication with the latch, the tang having a tang impact surface; and
    a damping member disposed upon the latch adjacent the latch impact surface and disposed between the latch and the tang with the head stack assembly in the parked position for damping impact between the tang and the latch and mitigating contact between the tang impact surface and the latch impact surface, the damping member having a damping member perimeter defining a damping member surface area less than the latch impact surface area.

2. The disk drive of claim 1 wherein the latch includes a latch cup and a latch cap disposed within the latch cup.

3. The disk drive of claim 2 wherein the latch cup has a cup open end, the cup open end defines the latch impact surface perimeter.

4. The disk drive of claim 2 wherein the cap closed end defines a cap closed end surface area, the damping member surface area is less than the cap closed end surface area.

5. The disk drive of claim 2 wherein the latch cap has a cap closed end, the latch cup has a cup open end disposed adjacent the cap closed end.

6. The disk drive of claim 5 wherein the cap closed end is off-set from the cup open end away from the tang by an off-set depth.

7. The disk drive of claim 6 wherein the damping member has a damping member thickness greater than the off-set depth.

8. The disk drive of claim 2 wherein the latch includes a magnetic element for magnetically attracting the tang to the latch with the head stack assembly in the parked position, the magnetic element is disposed within the latch cap.

9. The disk drive of claim 1 wherein the latch includes a magnetic element for magnetically attracting the tang to the latch with the head stack assembly in the parked position.

10. The disk drive of claim 1 wherein the damping member is generally circular.

11. The disk drive of claim 1 wherein the damping member is generally planar.

12. The disk drive of claim 1 wherein the damping member is adhesively attached to the latch.

13. The disk drive of claim 1 wherein the damping member includes a damping member contact surface for contacting the tang impact surface and a damping member attachment surface for attaching the damping member to the latch.

14. The disk drive of claim 13 wherein the damping member is formed of a viscoelastic adhesive.

15. The disk drive of claim 13 wherein the damping member is deformable with the damping member contact surface moving relative to the damping member attachment surface upon contact between the tang impact surface and the damping member contact surface.

16. A disk drive comprising:

a disk drive base;

a latch attached to the disk drive base, the latch including a latch impact surface, a latch cup and a latch cap-disposed within the latch cup;

a headstack assembly coupled to the disk drive base, the head stack assembly including a coil portion and a tang extending from the coil portion, the head stack assembly being sized and configured to rotate to a parked position with the tang in mechanical communication with the latch, the tang having a tang impact surface; and a damping member disposed upon the latch adjacent the latch impact surface and disposed between the latch and the tang with the head stack assembly in the parked position for damping impact between the tang and the latch and mitigating contact between the tang impact surface and the latch impact surface, the damping member having a damping member contact surface for contacting the tang impact surface and a damping member attachment surface for attaching the damping member to the latch, the damping member being deformable with the damping member contact surface moving relative to the damping member attachment surface upon contact between the tang impact surface and the damping member contact surface.

17. The disk drive of claim 16 wherein the latch impact surface has a latch impact surface perimeter, the latch impact surface perimeter defines a latch impact surface area, the damping member has a damping member perimeter that defines a damping member surface area less than the latch impact surface area.

18. The disk drive of claim 17 the latch cup has a cup open end, the cup open end defines the latch impact surface perimeter.

19. The disk drive of claim 17 the latch cap has a cap closed end that defines a cap closed end surface area, the damping member surface area is less than the cap closed end surface area.

20. The disk drive of claim 16 wherein the latch cap has a cap closed end, the latch cup has a cup open end disposed adjacent the cap closed end.

21. The disk drive of claim 20 wherein the cap closed end is off-set from the cup open end away from the tang by an off-set depth.

22. The disk drive of claim 21 wherein the damping member has a damping member thickness greater than the off-set depth.

23. The disk drive of claim 16 wherein the latch includes a magnetic element for magnetically attracting the tang to the latch with the head stack assembly in the parked position, the magnetic element is disposed within the latch cap.

24. The disk drive of claim 16 wherein the latch includes a magnetic element for magnetically attracting the tang to the latch with the head stack assembly in the parked position.

25. The disk drive of claim 16 wherein the damping member is generally circular.

26. The disk drive of claim 16 wherein the damping member is generally planar.

27. The disk drive of claim 16 wherein the damping member is adhesively attached to the latch.

28. The disk drive of claim 27 wherein the damping member is formed of a viscoelastic adhesive.

* * * * *